US010556418B2

United States Patent
Bastian et al.

(10) Patent No.: US 10,556,418 B2
(45) Date of Patent: Feb. 11, 2020

(54) SYSTEMS AND METHODS OF OPEN-CELL INTERNAL STRUCTURE AND CLOSED-CELL INTERNAL STRUCTURE GENERATION FOR ADDITIVE MANUFACTURING

(71) Applicant: Autodesk, Inc., San Rafael, CA (US)

(72) Inventors: Andreas Linas Bastian, Berkeley, CA (US); Gregory David Meess, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 299 days.

(21) Appl. No.: 15/432,693

(22) Filed: Feb. 14, 2017

(65) Prior Publication Data
US 2018/0229446 A1 Aug. 16, 2018

(51) Int. Cl.
*B29C 67/00* (2017.01)
*B33Y 50/02* (2015.01)
(Continued)

(52) U.S. Cl.
CPC ............ *B33Y 30/00* (2014.12); *B29C 64/386* (2017.08); *B33Y 50/00* (2014.12); *G06F 17/50* (2013.01); *G06F 17/5086* (2013.01); *B29C 64/364* (2017.08); *B33Y 40/00* (2014.12); *G06F 17/5018* (2013.01)

(58) Field of Classification Search
CPC ......... B33Y 10/00; B33Y 20/00; B33Y 30/00; B33Y 50/00; B33Y 50/02; B29C 64/10; B29C 64/20; B29C 64/30
See application file for complete search history.

(56) References Cited

U.S. PATENT DOCUMENTS 5,137,662 A * 8/1992 Hull ...................... G01J 1/4257
118/620
5,948,342 A * 9/1999 Nakazawa ............. B29C 64/153
264/400
(Continued)

OTHER PUBLICATIONS

Unknown author, "3D Printing Tips: Infill Percentage and Pattern Explained," (Aug. 29, 2016) [online] (retrieved from http://3dplatform.com/3d-printing-tips-infill-percentage-and-pattern-explained/), 11 pages.
(Continued)

*Primary Examiner* — Nahida Sultana
(74) *Attorney, Agent, or Firm* — Fish & Richardson P.C.

(57) ABSTRACT

Methods and systems, including medium-encoded computer program products, for generating internal structures usable in additive manufacturing include: obtaining a three-dimensional (3D) model of an object to be created by a 3D printer; determining a first slice of the 3D model; and generating first slice data that represents a portion of an internal structure in the first slice of the 3D model of the object, the slice data being usable for fabricating the first slice of the object during a 3D printing process, wherein the portion of the internal structure (i) includes cell structures corresponding to a respective point of a plurality of points with corresponding locations within the interior region, wherein each of the cell structures include an empty space inside the cell structure and (ii) includes a determined quantity of the cell structures based on an analysis of the 3D model.

12 Claims, 7 Drawing Sheets

(51) Int. Cl.
*B33Y 30/00* (2015.01)
*G06F 17/50* (2006.01)
*B33Y 50/00* (2015.01)
*B29C 64/386* (2017.01)
*B33Y 40/00* (2020.01)
*B29C 64/364* (2017.01)

(56) References Cited

U.S. PATENT DOCUMENTS

| | | | | |
|---|---|---|---|---|
| 2003/0222366 | A1* | 12/2003 | Stangel | A61C 13/0004 264/16 |
| 2010/0262272 | A1* | 10/2010 | Shkolnik | B33Y 30/00 700/120 |
| 2014/0017651 | A1* | 1/2014 | Sugimoto | G09B 23/30 434/272 |
| 2016/0221262 | A1* | 8/2016 | Das | G03F 7/70416 |
| 2016/0224017 | A1* | 8/2016 | Huang | B22F 3/1055 |
| 2017/0031207 | A1* | 2/2017 | Li | G02F 1/1313 |
| 2017/0072627 | A1* | 3/2017 | Li | B29C 64/386 |
| 2017/0294050 | A1* | 10/2017 | Popescu | B33Y 10/00 |
| 2018/0059631 | A1* | 3/2018 | Newell | B33Y 30/00 |
| 2018/0104912 | A1 | 4/2018 | Bastian et al. | |
| 2018/0150993 | A1* | 5/2018 | Newell | H04N 21/4728 |
| 2019/0163167 | A1* | 5/2019 | Roychowdhury | G05B 19/4099 |

OTHER PUBLICATIONS

Unknown author, "A Better Way to Design High-performance Structures," (Aug. 29, 2016) [online] (retrieved from http://machinedesign.com/archive/better-way-design-high-performance-structures), 7 pages.

Unknown author, "Isogrid—Wikipedia, the free encyclopedia," (Aug. 29, 2016) [online] (retrieved from https://en.wikipedia.org/wiki/Isogrid), 3 pages.

Unknown author, "Slic3r Manual—Infill Patterns and Density," (Aug. 29, 2016) [online] (retrieved from http://manual.slic3r.org/expert-mode/infill), 7 pages.

Unknown author, "Joint Model: Voronoi," (Sep. 29, 2016) [online] (retrieved from https://www.rocscience.com/help/phase2/webhelp/phase2_model/Joint_Model_Voronoi . . . ), 3 pages.

Jin et al., "Optimization of Process Planning for Reducing Material Consumption in Additive Manufacturing," Journal of Manufacturing Systems, 2017, 44:65-78.

Liu et al., "Current and Future Trends in Topology Optimization for Additive Manufacturing," Structural and Multidisciplinary Optimization, May 2018, published online a https://doi.org/10.1007/s00158-018-1994-3, 28 pages.

Lu et al., "Build-to-Last: Strength to Weight 3D Printed Objects," ACM Transactions on Graphics (TOG) TOG Homepage, vol. 33, Issue 4, Jul. 2014, Article No. 97, New York, NY, Article No. 97, 10 pages.

Wang et al., "Support-free Hollowing," IEEE Transactions on Visualization and Computer Graphics, Oct. 2018, 24(10):2787-2798.

Wu et al., "Infill Optimization for Additive Manufacturing—Approaching Bone-like Porous Structures," (Nov. 19, 2016) [online] (retrieved from https://arxiv.org/abs/1608.04366v2), 14 pages.

Taylor Landry, MatterHackers.com, Slice Settings Explained—Part 1, https://www.matterhackers.com/articles/slice-settings-explained-part-1, May 6, 2015.

Taylor Landry, MatterHackers.com, Slice Settings Explained—Part 2, https://www.matterhackers.com/articles/slice-settings-explained-part-2, Jun. 1, 2015.

Taylor Landry, MatterHackers.com, Slice Settings Explained—Part 3, https://www.matterhackers.com/articles/slice-settings-explained-part-3, Jul. 7, 2015.

Non-final Office Action in U.S. Appl. No. 15/296,910, dated Jun. 20, 2019, 14 pages.

Fish & Richardson, Response to Non-final Office Action in U.S. Appl. No. 15/296,910, filed Aug. 29, 2019, 12 pages.

* cited by examiner

SYSTEMS AND METHODS OF OPEN-CELL INTERNAL STRUCTURE AND CLOSED-CELL INTERNAL STRUCTURE GENERATION FOR ADDITIVE MANUFACTURING

BACKGROUND

This specification relates to additive manufacturing, such as fused filament fabrication (FFF) three dimensional (3D) printing.

FFF using extruded polymer filament is useful for manufacturing three dimensional objects. Current FFF printing is typically accomplished by forcing a solid plastic feedstock through a heated nozzle. The filament is liquefied before or as it passes through the constriction in the nozzle, and the feed pressure causes material to be extruded to form a beam of material added, layer by layer, to build the object. 3D models of objects can be designed using computer-aided design (CAD) software and then converted to toolpaths for the nozzle of a 3D extrusion printer, either by the CAD software or separate software, often referred to as a slicer. In addition, various techniques have been employed by slicer software to define tool paths for infill material to be 3D printed inside an object to be manufactured by the 3D printer.

SUMMARY

This specification relates to additive manufacturing, such as fused filament fabrication (FFF) three dimensional (3D) printing. In general, one or more aspects of the subject matter described in this specification can be embodied in one or more systems that include: a pressure controlled enclosure; a print bed within the pressure controlled enclosure; an extruder within the pressure controlled enclosure; a 3D printer motion system coupled with the print bed and the extruder and configured to move the extruder, the print bed, or both, to 3D print an object with internal closed structures in accordance with a 3D model of the object; and a controller coupled with the pressure controlled enclosure and the 3D printer motion system, wherein the controller is configured to direct the pressure controlled enclosure to generate different pressure levels during 3D printing of the object using the 3D printer motion system to cause the internal closed structures to have the different pressure levels therein.

Implementations according to this aspect may include a computer-implemented method comprising: obtaining a three-dimensional (3D) model of an object to be created by a 3D printer on a print bed of the 3D printer; determining a first slice of the 3D model that includes an exterior surface of the 3D model of the object and an interior region for the 3D model of the object located inside the exterior surface of the 3D model of the object for the first slice; generating first slice data that represents a portion of an internal structure in the first slice of the 3D model of the object, the slice data being usable for fabricating the first slice of the object during a 3D printing process, wherein the portion of the internal structure (i) includes cell structures corresponding to a respective point of a plurality of points with corresponding locations within the interior region, wherein each of the cell structures include an empty space inside the cell structure and (ii) includes a determined quantity of the cell structures based on an analysis of the 3D model; and determining additional slices of the 3D model that are arranged with respect to the first slice and layered along a z-axis from the print bed, wherein the first slice and the additional slices form a plurality of full cell structures during the 3D printing process that extend along the z-axis and form the internal structure usable to fill an interior region of the object and provide internal support for the object upon completion of the 3D printing process.

Implementations according to this aspect may include a computer-implemented method comprising: obtaining a three-dimensional (3D) model of an object to be created by a 3D printer on a print bed of the 3D printer; determining a first slice of the 3D model that includes an exterior surface of the 3D model of the object and an interior region for the 3D model of the object located inside the exterior surface of the 3D model of the object for the slice; generating first slice data that represents an internal structure in a first slice of the 3D model of the object, the slice data being usable for fabricating the first slice of the object during a printing process, wherein the portion of the internal structure (i) includes cell structures corresponding to a respective point of a plurality of points with corresponding locations within the interior region, wherein each of the cell structures include at least a portion usable to close the cell structure, and (ii) includes a determined quantity of the cell structures based on an analysis of the 3D model; and determining additional slices of the 3D model that are arranged with respect to the first slice and layered along a z-axis from the print bed, wherein the first slice and the additional slices form a plurality of closed cell structures during the 3D printing process that extend along the z-axis upward from the print bed to a portion of the vertical height of the object and forming the internal structure usable to fill the interior region of the object and support the object upon completion of the 3D printing process.

Particular embodiments of the subject matter described in this specification can be implemented to realize one or more of the following advantages. The use of internal structures (e.g., open cell and closed cell internal structures), composed of one or more concentric loops of deposited material, during an additive manufacturing process, such as FFF, can be used to perform varying and adjustable infilling to customize the printing of a 3D printed object to better meet desired properties and uses. Physical properties of the internal structures (e.g., size, pressure level, geometric shape) themselves can vary and are adjustable during the additive manufacturing process to tailor the infilling path used by 3D printer and achieve specified, or otherwise desired, physical properties for the 3D printed object. The internal structures can be adjustably aligned during infilling to achieve various structural configurations, such as splits and bridges, designed to achieve layering, or slicing, of a 3D printed object without exceeding the maximum overhang angle. Therefore, the internal structure generation techniques described support infilling in instances where the strength and stability of a 3D printed object according to existing FFF techniques may be otherwise compromised both during and after the additive manufacturing process (e.g., overhangs, top surfaces). Moreover, the 3D printer described can include a pressure controlled enclosure to support the control and adaptability of the additive manufacturing environment (e.g., pressure levels beyond nominal air pressure) and provide adjustable pressure levels. Also, the pressure controlled enclosure of the described 3D printer supports per-cell (or per group of cells) pressure control during fabrication, which furthers the adaptability of infilling the 3D object to meet desired physical properties.

The internal structures are generated by a computer program in an intentional manner that can reduce the total amount of infill material used, reduce the time needed for fabrication (e.g., less material can require less time), and also result in a stronger 3D object being built by additive manufacturing. The internal structures described use z-continuous structures (infill structures that do not have gaps between extruded beams in the vertical, z, 3D print direction) which can generate stronger infill structures that are stiffer, less prone to buckling, and subject to lower stresses than traditional "log-cabin" structures used as infill. Further, structures internal to the 3D object being manufactured can be automatically generated so as to take into account the overall structure of the 3D object. In some cases, a user can be given control over the nature and amount of internal structures that are generated while also ensuring that specified structural properties for the final 3D object being manufactured are satisfied. Moreover, tailoring the arrangement of the internal structures (e.g., choice of cell wall direction) can better align the infill with the shape of the part for better structural efficiency.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
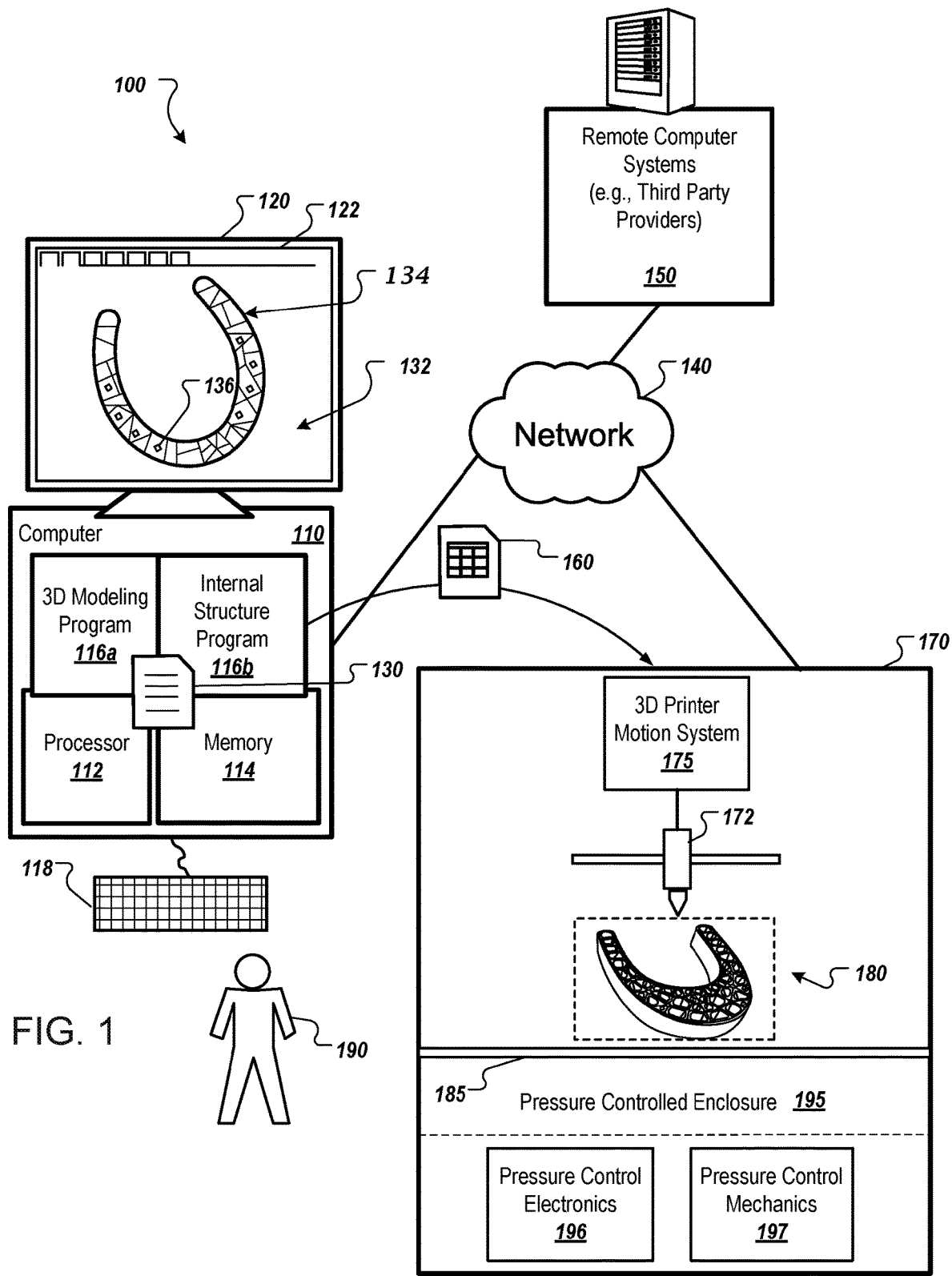
FIG. 1 shows an example of a system to design and manufacture objects using additive manufacturing techniques.

FIG. 1 shows an example of a system 100 to design and manufacture objects using additive manufacturing techniques. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112.

Such programs can include a 3D modeling program 116a, which can run locally on computer 110, remotely on a computer of one or more remote computer systems 150 (e.g., one or more third party providers' one or more server systems accessible by the computer 110 via the network 140), or both. The 3D modeling program 116a presents a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer.

A user 190 can interact with the 3D modeling program 116a to create a 3D model 132. This can be done using known graphical user interface tools. In the example shown, the 3D model 132 is an object in the shape of a horseshoe, but such a structure is not required. Rather, various suitable forms of 3D model 132 can be created to represent a wide variety of 3D objects that can be manufactured using additive manufacturing systems and techniques. In some implementations, the programs that run on the processor 112 include a slicer program, an internal structure generation program 116b, a tool path generation program, etc. Such programs can be separate from the 3D modeling program 116a or integrated into the 3D modeling program 116a or into each other. Thus, a "program" as referenced herein can be a procedure within another program. Moreover, in some implementations, such program(s) run on a processor in an additive manufacturing system 170, which can also include processor(s) and memory and constitute a computer, similar to computer 110.

In various implementations, the 3D modeling program 116a is programmed to provide various user interface elements to enable the user 190 to design the 3D model 132, specify materials and loading cases, physical properties, perform simulation, etc. Once the user 190 is satisfied with the model 132, the 3D model 132 is stored as a document 130 and/or used to generate another representation of the model (e.g., an STL file for additive manufacturing). This can be done upon request by the user 190, or in light of the user's request for another action, such as sending the 3D model 132 to the additive manufacturing system 170, which can be directly connected to the computer 110, e.g., integrated with the computer 110, or connected via the network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In any case, the 3D modeling program 116a is used to create the 3D model 132.

Further, to prepare the 3D model 132 for 3D printing, the internal structure generation program 116b is used to create internal structures 134 for the 3D model 132. The internal structures 134 can be designed in the 3D model as part of an infill setting to define an arrangement of infill material fabricated within the interior region of object during manufacturing. The internal structures 134 can be generated to have an open-cell or closed-cell structure according to the techniques described. As a general description, in some cases, an open-cell is an internal structure that can have a cylindrical geometric shaping, such as a tube, and having an open cavity. The closed cells can have varying or non-uniform geometric shapes and have a closed top and bottom. The open-cell and closed-cell structures are described in further detail in reference to FIGS. 2A-3. In the example shown, the infill setting for the 3D model has generated internal structures 134 as multiple open-cell structures, where each open-cell is centered about a respective point 136 selected, or otherwise positioned, by the internal structure program 116b. In some implementations, a point 136 can indicate another point for a corresponding cell that is not necessarily the center, such as an edge or multiple points 136 indicating a diameter constraint.

In some implementations, this generation of internal structures 134 is done automatically by the computer when the 3D model 132 is to be built using the additive manufacturing system 170. For example, the internal structure program 116b can be used to automatically select a number and associated location for multiple points 136 within the interior region of the 3D model 132 to correspondingly generate the internal structures 134. The internal structure program 116b can be configured to automatically determine parameters, or properties, for the 3D model 132 and the internal structures 134, to be able to satisfy desired physical properties of the 3D printed object, or to meet desired requirements (e.g., loading cases). Additionally, analysis of a generated 3D model 132 (or predicted model) can be performed by the internal structure program 116b, to initially specify and/or adjust the arrangement of the internal structures 134 according to specified parameters or desired properties. In some implementations, this generation of internal structures 134 is done based on user input, such as part of the design phase of the 3D model 132. The internal structure program 116b can utilize desired physical properties of the 3D printed object, such as an acceptable stiffness or weight, to determine an appropriate density setting for various regions of the infill structure. Accordingly, a specified number of points 136 can be selected, or otherwise calculated, by the software to achieve an appropriate infill density. As a general description, an increased density setting for a particular infill region of an object, causes the software to generate a larger number of points 136 for the region, thereby effectuating a greater number of cells used in filling the area.

Conversely, with lower density, fewer points 136 are generated. Similarly, respective locations for the points 136 can be determined by the software based on density settings satisfying desired physical properties of the 3D printed object. For instance, in implementing a higher density infill, multiple points 136 can be located within close proximity of each other, thereby generating multiple open-cells 134 that are densely spaced, or closely arranged, within the interior region of the object. Alternatively, a plurality of points 136 can be sparingly spaced within a region, creating a less dense infill in that section of the object. Determining the number and locations for points 136 can be performed and adjusted for a particular section of an object (or 3D model). For instance, the internal structure program 116b can compute a number of points 136 to be generated in a region of the object (e.g., bottom), or a number of points 136 to be generated for respective slices of a 3D model. Although discussed in terms of density, the generation of points 136 can be related to other parameters as deemed necessary or appropriate. In some implementations, points 136 are randomly generated.

In addition, in some implementations, the infill structure generation program 116b is part of the 3D modeling program 116a, and the internal structures 134 can be created as geometry of the 3D model 132 (e.g., boundary representations (Breps), constructive solid geometry (CSG), non-uniform rational basis spline (NURBS), etc.) and stored in the document 130. These structures 134 will thus be part the 3D model 132 when it is converted to a document 160 (of an appropriate format, such as G-code) for use by the additive manufacturing system 170. In other words, the CAD software on the computer 110 can provide the functionality described herein. In other implementations, a slicer (or similar) program can provide the functionality described herein. In such implementations, the internal structures 134 are generated when the 3D model 132 is converted into printing instructions for the 3D printer. Note that such implementations include those in which the functionality described herein is performed by a computer in the additive manufacturing system 170.

In any case, the additive manufacturing system 170 (e.g., an FFF 3D printer) includes a 3D printer motion system 175 utilized to control the operation and mechanical movement of at least one tool 172 (e.g., an extruder) during fabrication. The tool 172 operates in a build volume to create a 3D object 180, which corresponds to the 3D model 132 with the internal structures 134 added thereto. For example, the 3D printer motion system 175 moves the tool 172 along a toolpath, as it extrudes a heated material onto the print bed 185 for building layers, including an infill, of the 3D object 180. Although represented in FIG. 1 as an XYZ FFF 3D printer, it should be understood that the additive manufacturing system 170 represents many possible types of 3D printers, including delta 3D printers and other systems that can employ more than one type of tool, including potentially subtractive manufacturing tools.

Moreover, the additive manufacturing system 170 includes a pressure controlled enclosure 195 usable to control and adjust the manufacturing environment. In some existing FFF 3D printers, material is extruded, layer by layer, onto a print bed of the 3D printer to build the object in an open air environment. Therefore, properties of the material used in these current FFF techniques are constrained by the conditions of atmospheric pressure, or barometric pressure, that is exerted by the weight of air in the atmosphere, typically around 101.325 kPa. The described techniques address these limitations, by employing the pressure controlled enclosure 195, which is configured to cover the components of the manufacturing system 170, such as the tool 172 and print bed 185, to thereby control and/or change the manufacturing environment to allow the 3D printing process to be performed at pressure levels beyond that of normal air pressure. As an example, the pressure controlled enclosure 195 is configurable to operate at a range of pressures from 0.05 to 6 Atmospheres. (approximately 5 to 608 kPa). In some cases, it is possible to configure the pressure controlled enclosure 195 to achieve substantially large ranges of operational pressures to a desirable level of cost and complexity, for instance, by incorporating high-vacuum and/or high-pressure chambers. Moreover, in some cases, the attributes associated with utilizing different types of print materials, for instance the ability for some materials to retain greater pressure differentials, can be used to control the manufacturing environment pressure within the pressure controlled enclosure 195. In some implementations, the internal structure program 116b is configured to determine and communicate parameters to control the operational settings for the pressure controlled enclosure 195 prior to fabrication of the object (e.g., during 3D modeling). In some cases, the pressure controlled enclosure 195 is configured to determine and automatically set its operational configuration according to different variables, such as the current environmental conditions of the manufacturing system 170 (e.g., air pressure at higher altitude) and desired pressure levels of the cells. As a general description, the pressure controlled enclosure 195 is a closure, or chamber, designed to hold gases (or liquids) contained therein at a desired pressure level, that can be substantially different from the ambient pressure. The pressure controlled enclosure 195 includes components that can be understood in two main parts, the pressure control electronics 196, and pressure control mechanics 197. The pressure control electronics 196, and pressure control mechanics 197 system can be optionally implemented either internal, or external, to the pressure controlled enclosure 195. The pressure control electronics 196 can include one or more processors, such as a central processing units (CPUs), to execute instructions to operate the pressure controlled enclosure 195. The pressure control electronics 196 include at least one memory device to hold data and potentially instructions for the processor(s). The pressure control mechanics 197 can possess the electro-mechanical components necessary to support the variable pressure capabilities of the pressure controlled enclosure 195, such as gauges, valves, pumps, and the like.

Also, the pressure controlled enclosure 195 supports per-cell (or per group of cells) pressure control during fabrication, which furthers the adaptability of infilling to manufacture an object better tailored to meet desired physical properties. As an example, in the case of the closed-cell structures, the pressure controlled enclosure 195 can be set to maintain a desired pressure level, before capping each cell and allowing each of the cells to have a particular internal pressure. In some cases, pressure controlled enclosure 195 can be set in such a manner so as to enable each cell in the infill to have a different and unique internal pressure level. Additionally, the pressure controlled enclosure 195 can utilize additional settings (e.g., releasing a gas into the enclosure) as deemed desirable or appropriate to effectuate additional changes or control over other properties of the internal structures, and ultimately the manufactured object, such as thermal properties, density properties, and mechanical properties (e.g., different closed cells can be filled with different gasses). Therefore, employing the described pressure control system and techniques can allow for different structural properties of the internal cell structures in different regions of the object, thereby increasing customization of the infilling performed by the manufacturing system 170 to be tailored in view of desired loading cases, for example.

Note that the internal structures, which are manufactured to have different pressure levels using the system 170, can be the internal closed-cell structures described below, or other internal structures. For example, the system 170 can be used with the infill structures described in U.S. application Ser. No. 15/296,910, filed on Oct. 18, 2016, and entitled "SYSTEMS AND METHODS OF CELLULAR-HULL INFILL STRUCTURE GENERATION FOR ADDITIVE MANUFACTURING", which is hereby incorporated by reference in its entirety. In addition, although this disclosure focuses on extrusion based 3D printing, the systems and techniques described can be employed with other additive manufacturing techniques, such as granular techniques (e.g., Selective Laser Sintering (SLS) and Direct Metal Laser Sintering (DMLS)) and photopolymer techniques (e.g., stereolithography (SLA) and Digital Light Processing (DLP) 3D printing).

Figure 2A:
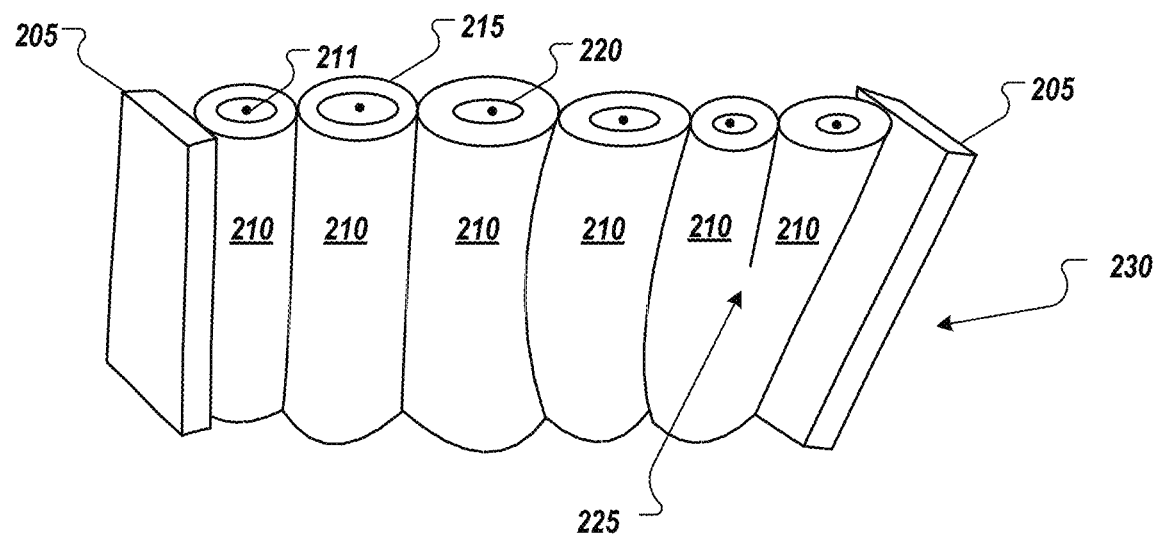
FIGS. 2A-2C show examples of open-cell internal structures used in the additive manufacturing techniques described.
Figure 2B:
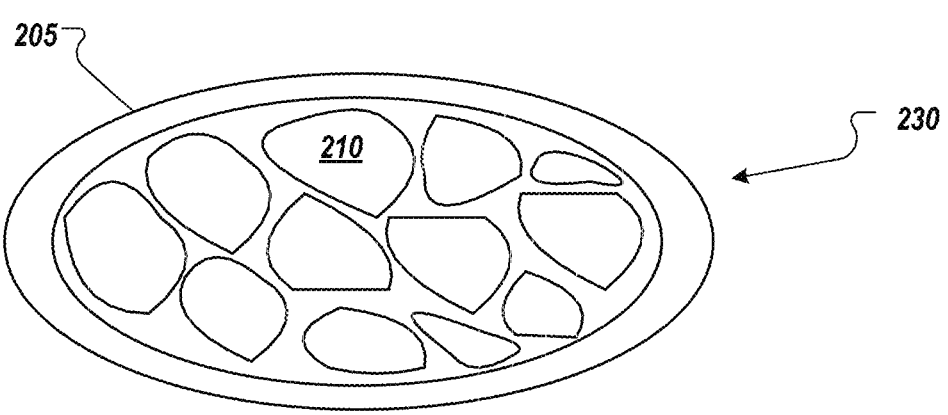
Figure 2C:
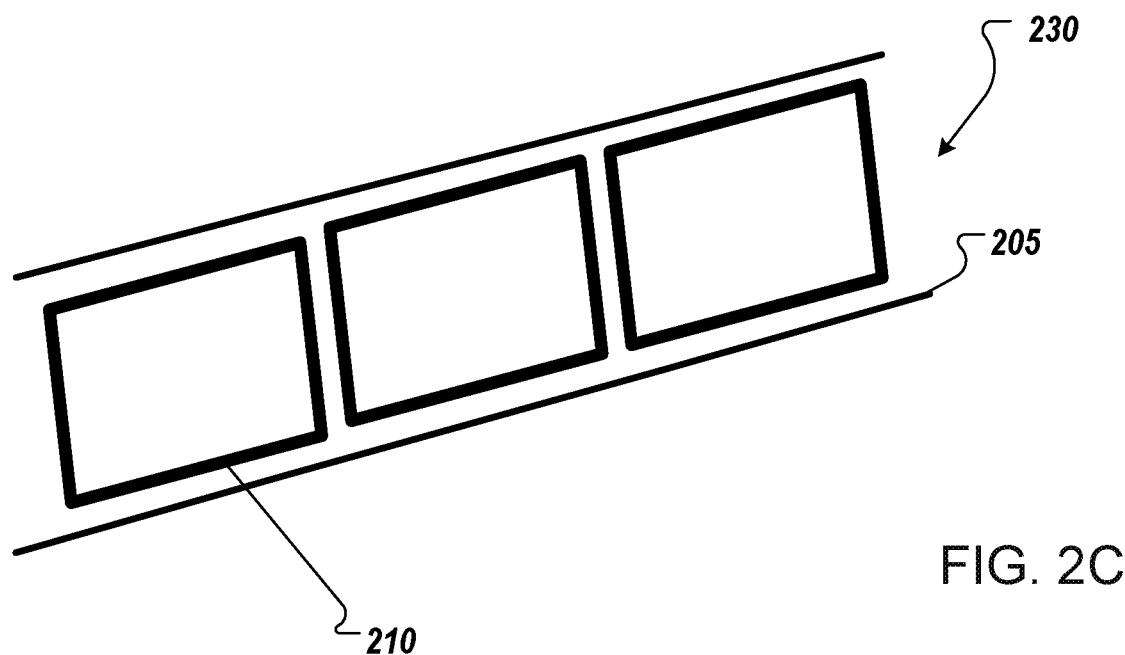

FIGS. 2A-2C show examples of open-cell structures used in the additive manufacturing techniques described. According to the techniques described, utilizing open-cell structures 210 can increase the strength created in the 3D printed object being manufactured, subject to user control, and using less material to form the object than would be needed if it were made entirely solid. Therefore, the open-cell structures 210, realized as a structurally efficient infilling technique, increase the strength-to-weight ratio of 3D printed objects in comparison with traditional infill. FIG. 2A shows a portion of an object 230, which is a 3D model of the object in some cases, including exterior surfaces 205. The interior region is located inside the exterior surfaces 205 and is illustrated as having an internal structure for an infill including multiple open-cell structures 210. In the example shown, the open-cell structures 210 are generated as a series of vertically elongated cells having a generally cylindrical geometric shape, referred to as tubes for the purposes of description. These tubes are created as a z-continuous deposition of material (e.g., without spaces in material formed by alternating directions between consecutive layers). In generating the open-cells 210 as z-continuous, the infill techniques described realize structural advantages over traditional "log-cabin" structures used as infill.

Although the open-cell structures 210 are illustrated as having a generally circular shapes in FIGS. 2A-2C, it is important to note that the open-cell and closed-cell structures of the embodiments can be generated having any suitable geometric shape. Additionally, each of the open-cell structures 210 are illustrated as having at least one empty spacing 220, or open cavity, along its surface. In the instances using tube shaped open-cell structures 210, as illustrated, each of the cell structures 210 can be created with a hollow center, having an open cavity extending along the entire vertical height of the cell. Dimensions and characteristics of the open-cell structures 210, including but not limited to: quantity of cells, size of cells, the distribution of cells, the geometric shape of cells, size (e.g., diameter) of cavity in cells, cell pressure level, and the like, can be specified by a user, or determined by the software (e.g., subject to user control). For instance, a 3D model can be analyzed by the internal structure program (shown in FIG. 1) in accordance with the specified properties required for the manufactured object, such as mechanical properties, strength properties, thermal properties, and density properties. The properties are taken into account by the software to generate data that is utilized to further determine, or otherwise calculate, the dimensions of the open-cell structures 210 used to fill the interior volume of the object. In some implementations, the dimensions for each are specified for each layer, or slice, of the object (or 3D model). Other approaches are also possible.

In the case of printing upper skins of an object, the tubes can be capped individually allowing for bridging between the cell structures. Arranging the open-cell structures 210 for bridging within the internal structure may be advantageous in layer-by-layer additive manufacturing techniques, for example in using a slicer, by providing sufficient contact or overhang between a lower infill layer and its successive layer, and thereby adequately supporting the top layer (e.g., preventing drooping) of an object while maintaining its hollow cavities in the cells of the infills. Although each of the open cells 210 have a generally similar shape, the cells shown are non-uniform. For example, the varying sizes of the open-cell structures 210 can be characterized by tubes having differing diameters. Conversely, multiple open-cell structures 210 of an internal structure can be generated to be of uniform geometries and properties throughout the entire, or a specified portion, of the infill. The open-cell structures 210 are also shown as having an exterior volume 215, or an outside wall of the tube surrounding the empty space inside of the cell structure. The exterior volume 215 can be created at a thickness that is implemented uniformly for all open-cells 210, or at varying thicknesses that are unique for each cell (or group of cells). In some instances, the exterior volume 215 can have the thickness of a single bead of extrusion. The thickness can be larger than one bead in other implementations. In some implementations, the open-cells 210 are generated by making an integer number, at least one, of concentric closed loops of deposited bead within the slice. For instance, the generally circular shaping of a closed-cell 210 illustrated in FIG. 2A can be fabricated by successively extruding beads of a predefined and uniform width, and using a specified number of beads forming the full circumference of the exterior volume 215 within each layer, or slice, of the infill.

In some instances, the open-cell structures 210 are full-height cell structures. That is, each of the open-cell structures 210 extend from the print bed of the 3D printer (shown in FIG. 1), for example, to a full vertical height of the part in a single cell. In addition, although described in the context of a simple tube shape, it is understood that the described systems and techniques are applicable to many complex cellular internal structures that can be 3D modeled with CAD software. Additionally, points 211 are shown that correspond to each of the open-cell structures 210. In some implementations, points 211 can be automatically selected by software to indicate a center-point for a cross-sectional geometry of the cell (center of a circle for purposes of generally circular cells), and used for creating the corresponding cell that is centered about that point 211. As shown, the point 211 is not necessarily the center of the cell, and can be slightly off-centered for example, or used to indicate the location for any point along the open-cell structure 210. In some cases, where points 211 indicate varying points of an open-cell structure 210, the points 211 are used to implement non-uniform cells within an internal infill structure. For instance, a single point 211 can be used as a center point for creating generally circular cells, and multiple points 211 can be used to indicate edges or vertices for other open-cells 210 having a polygon shape. Alternatively, for implementing uniform cells, the points 211 can be used to specify the same dimensions for each respectively generated open-cell structure 210. Using two points 211 separated by a defined distance to correspond to each cell within the infill structure, for example, can indicate a specific diameter used for uniformly generating each of the open-cell structures 210.

Additionally, the open-cell structures 210 can be re-arranged, such as merged or split, in order to change the number of cells in any given layer of the internal structure as deemed necessary or appropriate by the controlling mechanism (e.g., CAD, slicer). As illustrated, at splitting point 225, a single open-cell structure 210 in lower layers, or slices, of the infill has been split into separate parts, in this case halves, to create two open-cell structures 210 in subsequent infill layers. In effect, splitting of an open-cell structure 210 can increase the number cells within the internal structure of the 3D model. As a further example, splitting the open-cell structure 210 at 225 has increased the amount of tube "openings" or loops representing an individual open-cell structure 210 in a slice, or cross-section as aligned with the z-axis of the print bed, of the object. In some cases, substantial splitting of the open-cell structures 210 in a particular infill area of the object can be used to create more cells and accordingly increase the density of the infill pattern in respect to that portion of the interior region of the object. Conversely, a merging of open-cell structures 210 causes two distinct cells to combine so as to create a single open-cell entity. As an example, a number of points 211 can be determined for a particular density setting, as described in detail in reference to FIG. 1, and as the density of the infill changes in any given layer, the points 211 are correspondingly adjusted to effectuate a merge or split of tubes in the internal infill structure. In some cases, as exterior surfaces 205 come closer together in sections of an object, forming a smaller volume of space within the interior region, the density of the infill can also increase in that area of the object. Software implementing the infilling techniques described herein can accommodate for such changing interior spacing, and suitably adjust the internal infill structure in additional layers to compensate, for example, by replacing two points 211 with a single point 211 thereby merging two open-cells 210 (decreasing the number of cells). In contrast, as exterior surfaces 205 move further apart, and density decreases, the software can accordingly compensate by determining to split a single open-cell 210 by replacing a single point 211 in the interior structure with two points 211. Any number of points 211 in the interior infill structure, for example a group of points 211, can be changed, or otherwise adjusted, in a suitable manner to perform the merging and splitting techniques described. Any suitable combination of merging and/or splitting techniques can be used to adjust the internal structure in varying layers and sections of the infill to account for desired properties of the 3D printed objects.

FIG. 2B shows a cross-sectional view, or slice, of a portion of an object 230 having an internal structure including open-cell structures 210. The cross-section shown in FIG. 2B can be a slice of the object 230 taken in a horizontal plane (perpendicular to the Z print direction). The exterior surface 205 is illustrated as a wall having a volume of space within its interior, that is then filled with open cells 210. In some instances, the number, or filling quantity, of open-cell structures 210 used to fill the exterior surface 205 can be determined, and adjusted, based on the desired properties for the respective slice. As an example, in a slice that corresponds to an area that requiring stronger properties (e.g., stiffness) more infill material may be desirable, and therefore a larger number of open cells can be used in comparison to a slice associated with an area requiring less weight. Note that the open-cell structures 210 are generally circular, but have various shapes and sizes (e.g., non-uniform cells). By incorporating design goals such as loading cases (e.g., FEA simulation) and desired properties for the 3D printed object into the slicing, it is possible to generate tailored infill patterns at each respective layer according to the techniques described with increased adaptability and customization.

FIG. 2C shows an example of a top-view of a portion of an object 230 having an internal structure including open-cell structures 210. The top-view in 2C illustrates an example of utilizing the infill techniques described to generate an internal structure arrangement that aligns the cell walls in a manner that is geometrically tailored to the shape of the portion of the object 230. As illustrated, the cell walls of each respective open-cell structure 210 is uniformly oriented perpendicular to the exterior surface 205 of the object 230, thereby structurally contributing to the transverse strength of the portion, or layer, of the object 230. The arrangement of open-cell structures 210, as illustrated in 2C, can generate an infill pattern with increased adaptability and strength as compared to some existing infilling techniques, for instance a rectilinear infill with lines running at smaller acute angles (e.g., 5°) to the object's exterior surface.

Figure 2D:
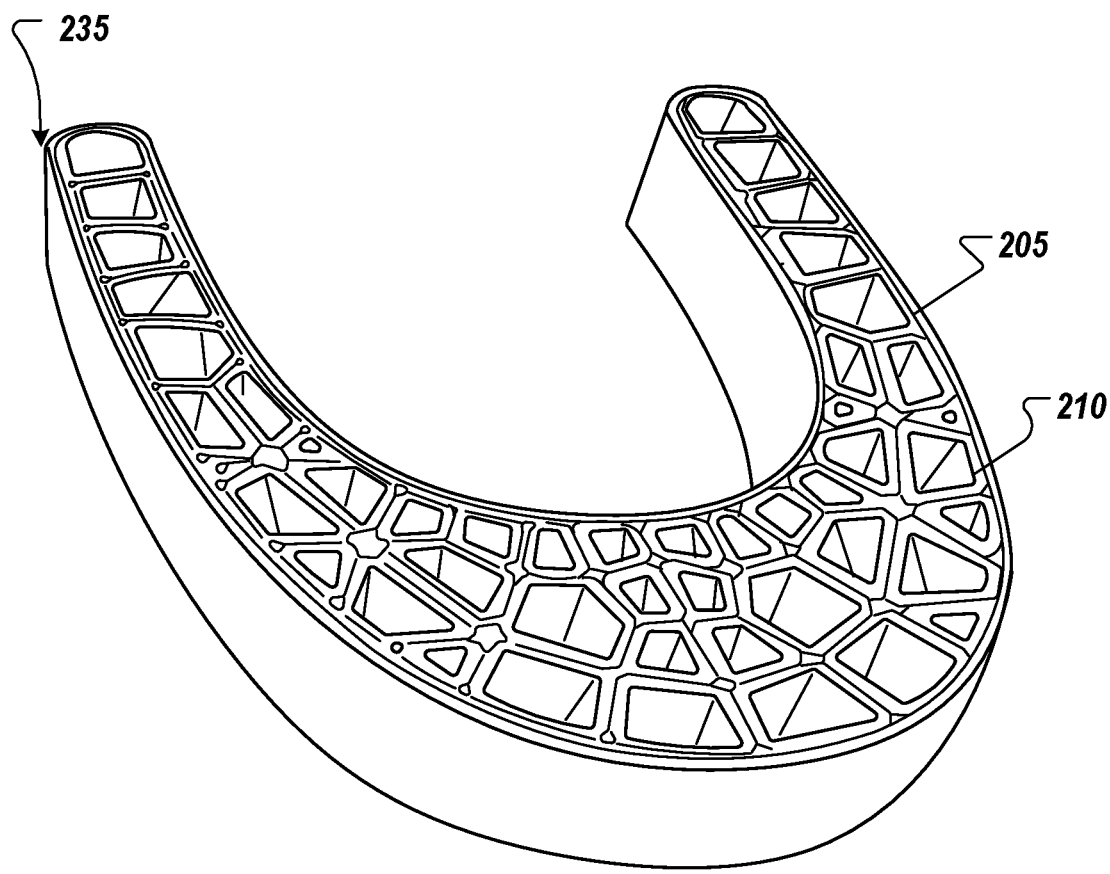
FIG. 2D shows an example of an object manufactured using additive manufacturing techniques described.

FIG. 2D shows an example of an object manufactured using additive manufacturing techniques described. In this example, the manufactured object 235 is a horseshoe shaped object having an exterior surface 205 having material lining the surface area of the object 235. To create the respective internal structures, shown as various shapes, filling the space within the inside region of the object 235, the open-cell structures 210 are used according to the additive manufacturing techniques described.

Figure 3:
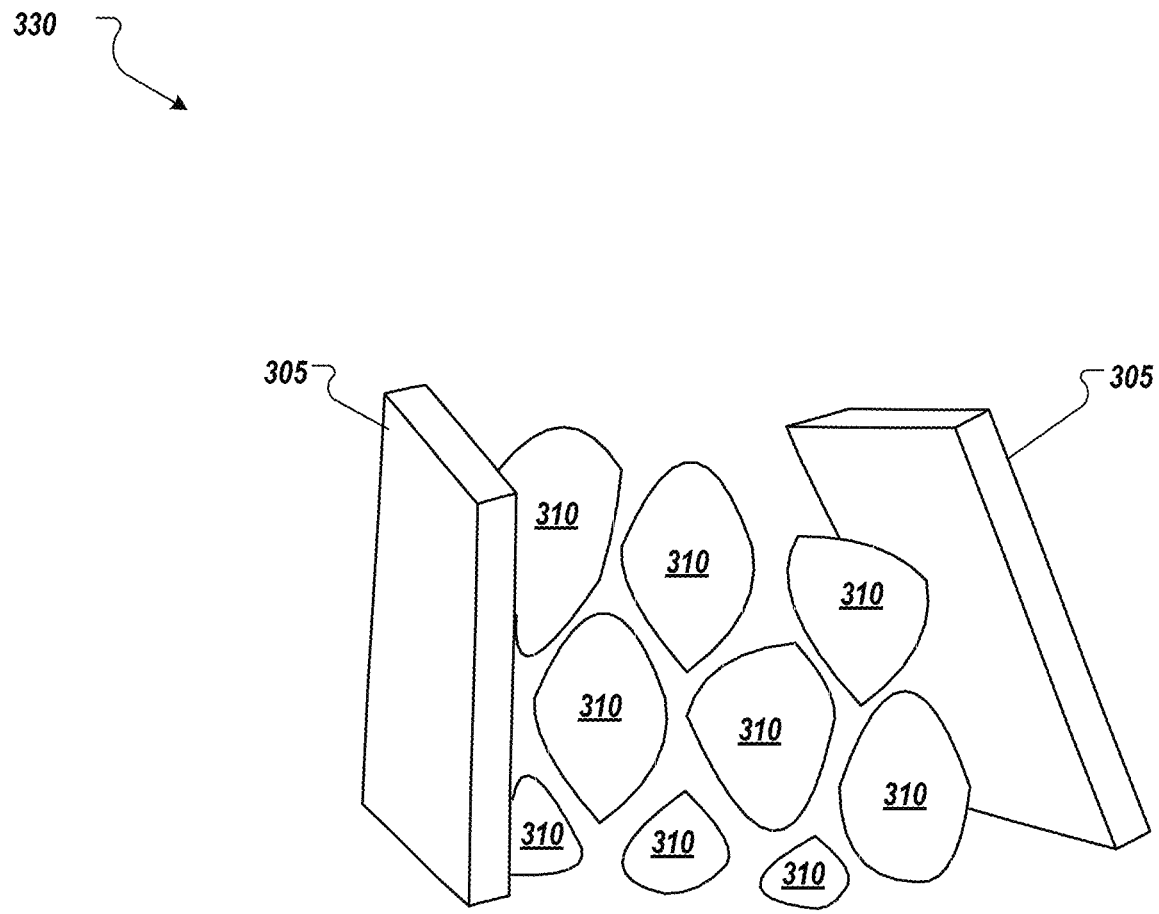
FIG. 3 shows examples of closed-cell internal structures used in the additive manufacturing techniques described.

FIG. 3 shows examples of closed-cell structures 310 used in the additive manufacturing techniques described. Utilizing closed-cell structures 310 having a completely closed surface at the top and bottom of the cells, as compared to open-cell structures (shown in FIG. 2), can be used to provide additional strength to a manufactured part, as needed. A portion of an object 330, which is a 3D model of the object in some cases, is shown to include exterior surfaces 305 separated by a volume of space. Closed-cell structures 310 are used to fill the space between exterior surfaces 305. For clarity of presentation, the closed-cell structures 310 are illustrated as generally circular in shape, for clarity of presentation. However, many different regular or irregular shapes can be used to form the closed-cell structures 310. Additionally, the closed-cell structures 310 as illustrated have tapered edges so that the exterior surface 305 can be filled by stacking the closed-cell structures 310 vertically along the Z-axis from the print bed, in a manner allowing each of the cells to have coincident connecting faces. Filling the exterior surface 305 in this manner creates substantially negligible separation (full contact) between neighboring cells, and mitigates the need for support during the manufacturing process. This process can be repeated until the entire volume within the exterior surfaces 305 of the 3D model is filled with the closed-cell structures 310, for instance, up to the vertical height of the object. In some cases, the closed-cell structures 310 are used to fill a portion, or partial-height of the manufactured part. For example, traditional infill, having a lower density, can be used to provide the base for top layers in FFF printing in conjunction with closed-cell structures 310 used to fill the remaining layers to provide additional strength to the manufactured part.

Dimensions and characteristics of the closed-cell structures 310, including but not limited to: quantity of cells, size of cells, the distribution of cells, the geometric shape of cells, size (e.g., diameter) of cavity in cells, cell pressure level, and the like, can be specified by a user, or determined by the software (e.g., subject to user control). Additionally, the dimensions and characteristics for the closed-cell structures 310 can be determined and adjusted per-slice, for example, so as to generate an internal structure for a manufactured object that is respectively tailored for different regions of the object, as described in detail in reference to FIG. 2A. Additionally, closed-cell structures 310 can be formed using the pressure control techniques described in relation to the pressure controlled enclosure (shown in FIG. 1) so to achieve specified pressure levels inside of the cells. As an example, the pressure controlled enclosure can be set to a desired pressure level during fabrication (e.g., 60 psi) and prior to capping each individual cell, thereby allowing each closed-cell structure 310 to have a different and distinct internal pressure level. In some cases, a defined group, or number, of closed-cell structures 310 can be created to have a shared internal pressure level. For instance, all of the closed-cell structures 310 included in a bottom region of the object can be formed having the same internal pressure level. As will be appreciated, many variations are possible here. Infilling using closed-cell structures 310 can further apply the per-cell pressure control techniques described to adjust for different structural properties in different parts of the 3D printed object, for example in view of loading cases. As an example, per-cell pressure control can be used to provide additional strength (e.g., tensile, bending) to specific areas of the object 330, as needed. Moreover, adding internal pressure, using the per-cell pressure control techniques described, can put the material in tension as it expands outwards, thereby increasing rigidity through using the internal gas, such as air, as the structural member. For the purposes of illustration, improving rigidity by adding internal pressure to a closed-cell structure 310 can be akin to the differences between an inflated and deflated balloon. Also, the per-cell pressure control techniques described can provide additional advantages associated with resistance to buckling and other comprehensive failure modes by increasing, or otherwise adding, to the pre-tension of the cells.

Figure 4A:
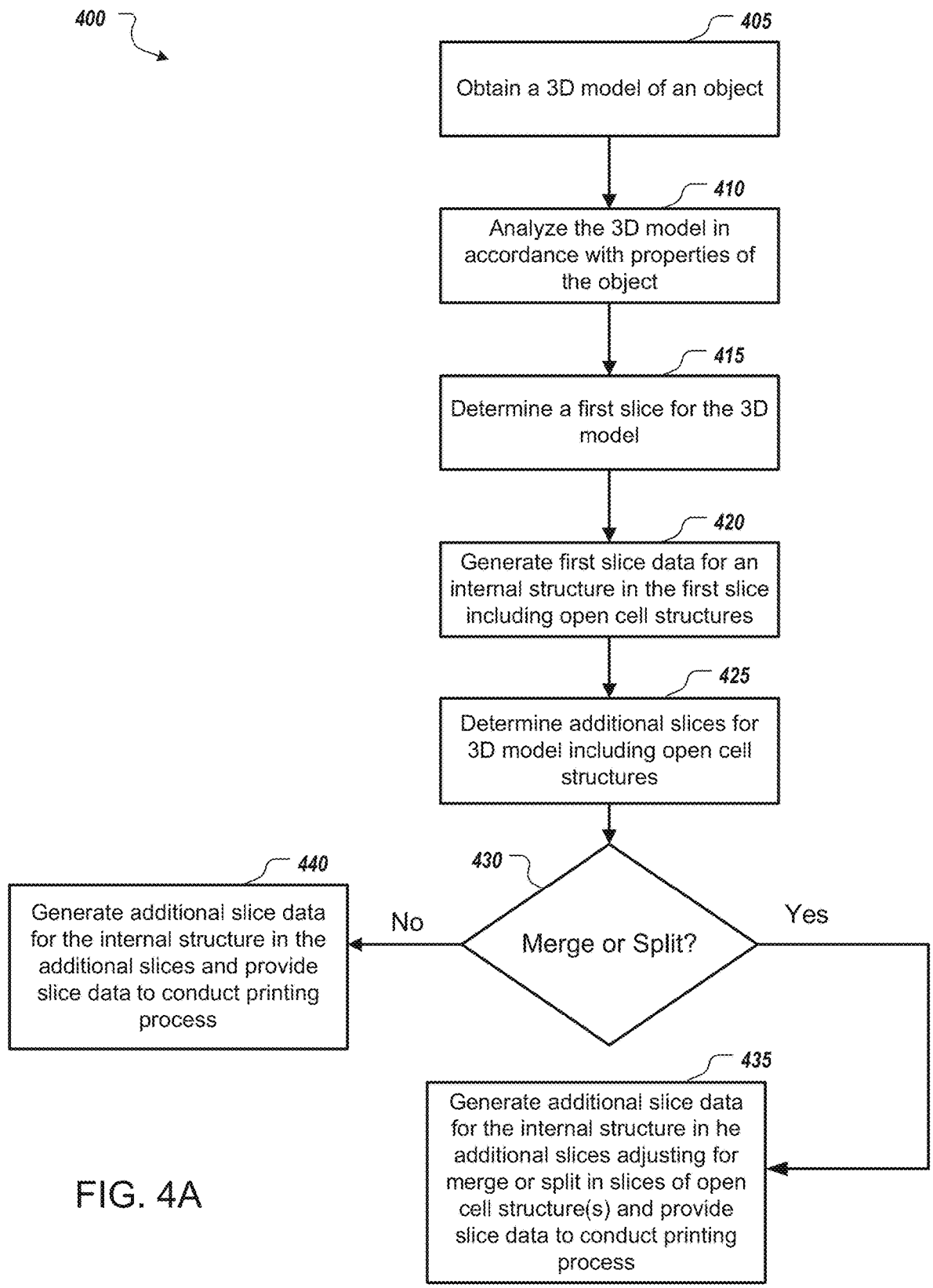
FIG. 4A shows an example of a process for generating open-cell internal structures for a 3D model.

FIG. 4A shows an example of a process 400 for generating open-cell internal structures for a 3D model. The 3D model is obtained 405, where the 3D model is a model of an object that can be additively manufactured (e.g., 3D printed with a FFF 3D printer). Obtaining 405 the 3D model can include receiving the 3D model from another source or location, e.g., loading the 3D model from a permanent storage device (e.g., a disk drive). Alternatively, or additionally, obtaining 405 the 3D model can include generating the 3D model based on received input (e.g., creating the 3D model in CAD software based on user input).

Further, the 3D model is analyzed 410 in accordance with properties of the object. In some implementations, the desired properties, or structural characteristics, of an object (or regions of the object), such as the strength-to-weight ratio, is specified by a user. In some implementations, the desired properties are specified by the software. In addition, in some implementations, the analysis 410 can optimize the internal structure to arrive at a desirable internal structure for the 3D model. According to the example of process 400, the internal infill structure of the 3D model is formed using open-cell structures that are designed based on the described analysis.

Analysis of the 3D model, as an example, can receive the structural properties of the 3D model to be simulated with an initial infill structure included. This can include using FEA (Finite Element Analysis) simulation, such as using FEA for strength optimization. The simulated structural properties can be compared to the structural characteristics that have been specified for the object being modeled. The desirable structural characteristics can be specified by a user, specified by a software component of a system, or a combination of these. The desired structural characteristics can correspond to multiple design goals, and so there can be more than one optimization routine and more than one optimization parameter. Note that a user may need to decide how to weigh different optimization goals, unless certain goals are derived from geometry of the 3D model (e.g., based on interferences and obstacles).

Thereafter, a first slice for the 3D model is determined 415 based on the 3D model. According to some FFF techniques, a 3D printing process involves adding material to build the object in a layer-by-layer approach. In some implementations, a slicer program is used to convert the 3D model into a toolpath for the nozzle of a 3D extrusion printer, and a first slice, or initial toolpath, is determined 415 by the slicer. Note that although this description focuses on implementation using a slicer, in some implementations, CAD software provides the functionality described herein. In this case, the slice determinations, and generated slice data, are performed by CAD software, and the slice data can be implemented as CAD geometry (e.g., tessellate geometry) that is added to a 3D model for an object, which can then be sent to a traditional slicer program for generating tool path data for a 3D printer. Thus, as used herein, references to "slices" and "slice data" include layers and layer data generated by software other than a slicer program. In some instances, the infilling techniques described are implemented as part of the slicer/toolpathing functionality, as opposed to implementation in the mesh or modeling domains, so as to generate internal structures utilizing beads deposited as infills. In some cases, utilizing bead deposited infilling, is a more flexible infilling technique as compared to the approach including internal structures in the mesh. For instance, structures can be flexibly adapted at the slicer, where the structures are generated for printers with different sized nozzles from the same input mesh. Another example of increased flexibility at the slicer can include scaling the mesh without affecting the thickness of the cell walls. Treating the deposited beads as a structural "paintbrush" allows the infilling techniques described to fabricate parts with increased strength/material ratio, or with increased tailoring to achieve specific desired properties.

Additionally, the process 400 generates 420 first slice data for the 3D model and the internal infill structures for the 3D model. Generating slice data can include passing the 3D model and internal structures to a slicer program to generate G-code that is able to cause a specific type of 3D printer to build the object. In some cases, the internal structure is based on the analysis performed at 410, so as to incorporate design goals into the slicing portion of the 3D printing process. Generating the first slice data can be implemented in various ways based on the analysis. In some implementations, calculations can be performed relating 3D model specifications to define the internal structure, for example, resulting in values used for open-cell dimensions and characteristics. For example, a user can set a range of values acceptable for the manufactured object, and the software can select locations for a plurality of points within the interior region of the slice, where each point corresponds to an open-cell structure (e.g., center points for the cells) used for infilling, as described in detail in reference to FIG. 1. In continuing with the example, the software can select the points based on the details and analysis of the geometry of the 3D model.

Subsequently, additional slices are determined 425 for the remaining portions of the 3D model. The additional slices correspond to successive layers added vertically along a Z-axis from the print bed, during fabrication. In some implementations, each of the additional layers of the 3D model are considered, for example by software, to determine if any adjustments, or changes, to the current internal structures is deemed necessary or appropriate.

As an example, a check 430 is performed to determine whether any of the open-cell structures in the additional slices should be merged or split. For instance, in a slice corresponding to a particular region of the 3D model requiring an increased infill density, open-cell structures can be split so as to increase the amount of cells used to fill the region during fabrication, as described in detail in reference to FIG. 2A.

In some implementations, a check involves determined whether the desired structural characteristics are not adequately satisfied by the current internal structure, and one or more parameters that defined the creation of the infill structure for the 3D model can be adjusted to improve the simulated structural properties in relation to the specified structural characteristics. This simulation can be repeated, and can continue until an optimization threshold value (e.g., as set by a user) is reached where there is diminishing returns on further iterations. In some implementations, initial values for the dimensions of the open cells, for example, are set as proportional to the geometry of the 3D model.

In the case that changes to the internal structures are identified at 430 (i.e., Yes), the process 400 proceeds to generate 435 additional slice data for the internal structure adjusting the data for the changes (e.g., merge, split) to the dimensions or characteristics for the open-cell structures in the appropriate slice. Although merge and split as shown, it will be appreciated that many variations to the internal infill structure, and namely the open cells, can be implemented. Thus, according to the techniques described, the infill pattern is not required to be uniform throughout the object, as in the case of existing infill techniques. The open-cell structures can vary at different regions, realizing a process tailoring the infill to satisfy structural goals of the manufactured object.

In the event that no changes to the internal structure have been determined as needed for the additional slices of the 3D model (i.e., No), slice data for the additional slices is generated 440 without further adjusting the open-cell dimensions. As an example, if the initial internal structure is not adjusted, the open-cell tubes of the first slice can be replicated as the process repeats for additional layers along the Z-print direction to the full height of the object.

In any case, once an appropriate first slice data and additional slice data is generated for the 3D model, the slice data for 3D model including the infill structure for the 3D model can be provided for use in additive manufacturing. This can involve sending the toolpath defined by the slice data to the additive manufacturing system to build the object.

Figure 4B:
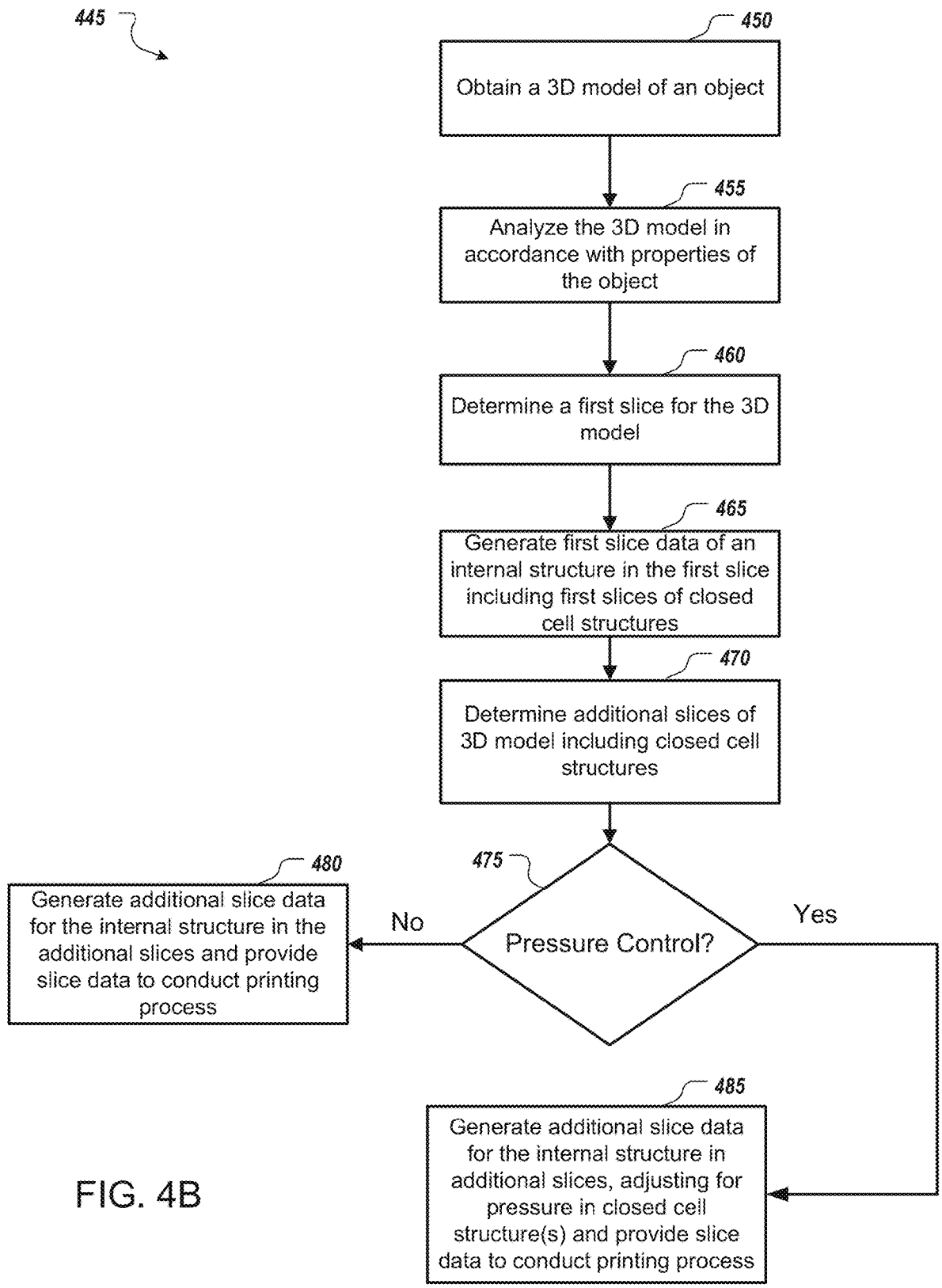
FIG. 4B shows an example of a process for generating closed-cell internal structures for a 3D model.

FIG. 4B shows an example of a process 445 for generating closed-cell internal structures for a 3D model. The 3D model is obtained 450, where the 3D model is a model of an object that can be additively manufactured (e.g., 3D printed with a FFF 3D printer).

Upon receiving the 3D model, the 3D model is analyzed 455 in accordance with properties of the object. In some implementations, the desired properties of an object (or regions of the object), such as the strength-to-weight ratio, are specified by a user. In some implementations, the desired properties are specified by the software based on a desired use, such as loading cases (e.g., FEA simulation).

Thereafter, a first slice for the 3D model is determined 460. Then, the process 445 generates 465 slice data for the internal infill structures for the 3D model. In the example, the infill of the 3D model is formed using closed-cell structures. In some cases, the internal structure is based on the analysis performed at 455, so as to incorporate design goals into the slicing portion of the 3D printing process. Generating the first slice data can be implemented in various ways based on the analysis. In some implementations, calculations can be performed relating 3D model specifications to define the internal structure, for example, resulting in values used for closed-cell dimensions and characteristics. For example, a user can set a range of values acceptable for the manufactured object, and the software can select locations for a plurality of points within the interior region of the slice, where each point corresponds to a closed-cell structure (e.g., center points for the cells) used for infilling. In continuing with the example, the software can select the points based on the details and analysis of the geometry of the 3D model, as described in detail in reference to FIG. 1.

Thereafter, additional slices are determined 470 for the remaining portions of the 3D model. A check 475 is performed to determine whether any of the closed-cell structures in the additional slices should be formed having a specific internal pressure level, and therefore subject to pressure controlled techniques. For instance, in a particular region of the 3D model requiring an increased strength, the pressure within the pressure controlled manufacturing environment can be adjusted prior to capping the closed-cell structures utilized for filling that respective region during fabrication. In the case that changes to the internal structures are identified 475 (i.e., Yes), the process 445 proceeds to generate 485 additional slice data for the internal structure adjusting the data for the changes in pressure levels for the closed-cell structures. In some cases, control information (e.g., pressure setting) is added to the slice data be conveyed to, and performed by, the pressure control enclosure components of the manufacturing system. Although per-cell pressure control as shown, it will be appreciated that many variations to the internal infill structure, and namely the closed cells, can be implemented. Thus, according to the techniques described, the infill pattern is not required to be uniform throughout the object. The open-cell structures can vary at different regions, realizing a process tailoring the infill to satisfy structural goals of the manufactured object.

In the event that no changes to the internal structure have been determined as needed for the additional slices of the 3D model (i.e., No), slice data for the additional slices is generated 480 without further adjustments or additional pressure control data. In any case, once an appropriate first slice data and additional slice data is generated for the 3D model, the slice data for 3D model including the infill structure for the 3D model can be provided for use in additive manufacturing.

Figure 5:
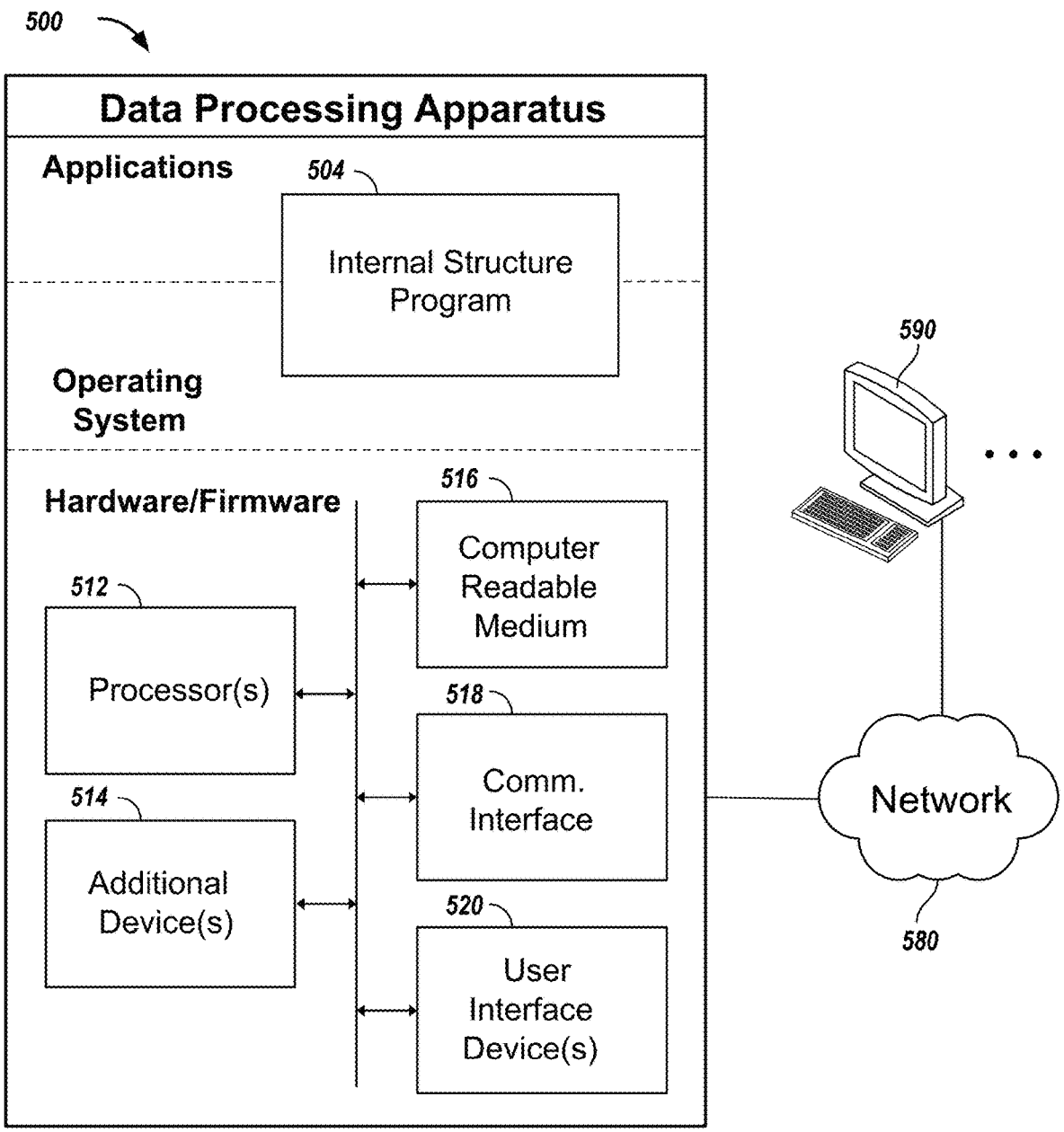
FIG. 5 is a schematic diagram of a data processing system including a data processing apparatus, which can be programmed to implement the processes described herein.

FIG. 5 is a schematic diagram of a data processing system including a data processing apparatus 500, which can be programmed as a client or as a server. The data processing apparatus 500 is connected with one or more computers 590 through a network 580. While only one computer is shown in FIG. 5 as the data processing apparatus 500, multiple computers can be used. The data processing apparatus 500 includes various software modules, which can be distributed between an applications layer and an operating system. These can include executable and/or interpretable software programs or libraries, including tools and services of an internal structure program 504, such as described above. The number of software modules used can vary from one implementation to another. Moreover, the software modules can be distributed on one or more data processing apparatus connected by one or more computer networks or other suitable communication networks.

The data processing apparatus 500 also includes hardware or firmware devices including one or more processors 512, one or more additional devices 514, a computer readable medium 516, a communication interface 518, and one or more user interface devices 520. Each processor 512 is capable of processing instructions for execution within the data processing apparatus 500. In some implementations, the processor 512 is a single or multi-threaded processor. Each processor 512 is capable of processing instructions stored on the computer readable medium 516 or on a storage device such as one of the additional devices 514. The data processing apparatus 500 uses its communication interface 518 to communicate with one or more computers 590, for example, over the network 580. Examples of user interface devices 520 include a display, a camera, a speaker, a microphone, a tactile feedback device, a keyboard, and a mouse. The data processing apparatus 500 can store instructions that implement operations associated with the modules described above, for example, on the computer readable medium 516 or one or more additional devices 514, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the invention have been described. Other implementations are within the scope of the following claims. In addition, the actions recited in the claims can be performed in a different order and still achieve desirable results.

What is claimed is:

1. A computer-implemented method comprising:
   obtaining a three-dimensional (3D) model of an object to be created by a 3D printer on a print bed of the 3D printer;
   determining a first slice of the 3D model that includes an exterior surface of the 3D model of the object and an interior region for the 3D model of the object located inside the exterior surface of the 3D model of the object for the first slice;
   generating first slice data that represents a portion of an internal structure in the first slice of the 3D model of the object, the slice data being usable for fabricating the first slice of the object during a 3D printing process, wherein the portion of the internal structure (i) includes cell structures corresponding to a respective point of a plurality of points with corresponding locations within the interior region, wherein each of the cell structures include an empty space inside the cell structure and (ii) includes a determined quantity of the cell structures based on an analysis of the 3D model; and
   determining additional slices of the 3D model that are arranged with respect to the first slice and layered along a z-axis from the print bed, wherein the first slice and the additional slices form a plurality of full cell structures during the 3D printing process that extend along the z-axis and form the internal structure usable to fill an interior region of the object and provide internal support for the object upon completion of the 3D printing process.

2. The method of claim 1, wherein the portion of the internal structure includes at least two of the cell structures having a same geometric shape.

3. The method of claim 1, wherein the portion of the internal structure includes at least one cell structure having a different geometric shape than another of the cell structures.

4. The method of claim 1, comprising:
   determining to split the internal structure in the additional slices of the 3D model, wherein the split comprises splitting at least one of the plurality of full cell structures to create two cell structures that extend from the internal structure; and generating, for the additional slices, additional slice data that represents the internal structure in the additional slices based on the determination to split the internal structure.

5. The method of claim 1, comprising:

generating, for the additional slices, additional slice data that represents the internal structure in the additional slices and including an adjustment to the internal structure, wherein the adjustment comprises a merger of at least two of the plurality of full cell structures to create a single cell structure that extends from the internal structure.

6. The method of claim 1, comprising:

randomly generating the plurality of points within the interior region.

7. The method of claim 1, comprising determining a quantity of the plurality of points within the interior region based on a density for the object, a density of the internal structure, or a threshold corresponding to a physical strength of the object.

8. The method of claim 1, comprising:

determining an adapted quantity of the plurality of points and corresponding adapted locations of the plurality of points within the interior region for the 3D model of the object.

9. The method of claim 1, comprising:

analyzing the 3D model in accordance with specified properties of the object comprising mechanical properties, strength properties, thermal properties, and density properties for determining slice data representing an internal structure having specifications usable to meet the specified properties of the object.

10. A computer-implemented method comprising:

obtaining a three-dimensional (3D) model of an object to be created by a 3D printer on a print bed of the 3D printer;

determining a first slice of the 3D model that includes an exterior surface of the 3D model of the object and an interior region for the 3D model of the object located inside the exterior surface of the 3D model of the object for the slice;

generating first slice data that represents an internal structure in a first slice of the 3D model of the object, the slice data being usable for fabricating the first slice of the object during a printing process, wherein the portion of the internal structure (i) includes cell structures corresponding to a respective point of a plurality of points with corresponding locations within the interior region, wherein each of the cell structures include at least a portion usable to close the cell structure, and (ii) includes a determined quantity of the cell structures based on an analysis of the 3D model; and determining additional slices of the 3D model that are arranged with respect to the first slice and layered along a z-axis from the print bed, wherein the first slice and the additional slices form a plurality of closed cell structures during the 3D printing process that extend along the z-axis upward from the print bed to a portion of the vertical height of the object and forming the internal structure usable to fill the interior region of the object and support the object upon completion of the 3D printing process.

11. The method of claim 10, comprising:

generating, for the additional slices, additional slice data that represents the internal structure in the additional slices and the plurality of closed cell structures having an internal pressure level, wherein the internal pressure level is controlled during the printing process in accordance with a configuration of a pressure controlled enclosure of the 3D printer.

12. The method of claim 10, wherein the internal pressure level varies between two or more closed cells structures.

* * * * *